(12) United States Patent
Iizuka

(10) Patent No.: US 6,917,470 B2
(45) Date of Patent: *Jul. 12, 2005

(54) OPTICAL APPARATUS

(75) Inventor: Toshimi Iizuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/829,913

(22) Filed: Apr. 11, 2001

(65) Prior Publication Data

US 2001/0012155 A1 Aug. 9, 2001

Related U.S. Application Data

(62) Division of application No. 08/906,107, filed on Aug. 5, 1997, now Pat. No. 6,246,520, which is a continuation of application No. 08/567,065, filed on Dec. 4, 1995, now abandoned, which is a continuation of application No. 08/093,700, filed on Jul. 20, 1993, now abandoned.

(30) Foreign Application Priority Data

Jul. 24, 1992 (JP) .............................. 4-198682

(51) Int. Cl.[7] .............................. G02B 27/64; G02B 7/18
(52) U.S. Cl. ........................ 359/557; 359/554; 359/407; 359/831
(58) Field of Search ................................. 359/554–557, 359/676–690, 831–837, 407–409, 399–400, 431; 396/52–55; 348/208

(56) References Cited

U.S. PATENT DOCUMENTS

| | | | |
|---|---|---|---|
| 3,503,663 A | 3/1970 | De La Cierva et al ..... | 359/557 |
| 3,514,192 A * | 5/1970 | De La Cierva ............. | 359/557 |
| 3,608,995 A | 9/1971 | Humphrey ................... | 359/557 |
| 3,942,862 A | 3/1976 | Furukawa et al. .......... | 359/557 |
| 4,013,339 A | 3/1977 | Ando et al. ................. | 359/556 |
| 4,063,261 A | 12/1977 | Kuboshima ................... | 396/52 |
| 4,673,262 A * | 6/1987 | Tsuji ........................... | 359/363 |
| 5,042,930 A | 8/1991 | Hutt ............................ | 359/407 |
| 5,107,293 A * | 4/1992 | Sekine et al. ................. | 396/55 |
| 5,140,462 A | 8/1992 | Kitagishi ..................... | 359/557 |
| 5,172,150 A * | 12/1992 | Teramoto et al. ............. | 396/55 |
| 5,175,580 A * | 12/1992 | Shiomi ......................... | 396/55 |
| 5,182,671 A | 1/1993 | Kitagishi et al. ........... | 359/557 |
| 5,311,367 A | 5/1994 | Ohki et al. ................... | 359/832 |
| 5,315,435 A | 5/1994 | Horiuchi ...................... | 359/554 |
| 5,416,557 A * | 5/1995 | Nagasaki et al. ............. | 396/52 |
| 5,661,597 A | 8/1997 | Sugawara .................... | 359/362 |
| 5,672,862 A | 9/1997 | Ohara et al. ................. | 250/204 |
| 6,246,520 B1 * | 6/2001 | Iizuka ........................ | 359/557 |

FOREIGN PATENT DOCUMENTS

| | | | |
|---|---|---|---|
| JP | 50-5058 | 1/1975 | |
| JP | 3-95533 | 4/1991 | |
| JP | 3-200229 | * 9/1991 | ................. 359/554 |
| JP | 3-235927 | 10/1991 | |
| JP | 4-20942 | 1/1992 | |
| RU | 205621 | 11/1967 | |

* cited by examiner

*Primary Examiner*—Thong Q Nguyen
(74) *Attorney, Agent, or Firm*—Fitzpatrick, Cella, Harper & Scinto

(57) ABSTRACT

This invention relates to an optical apparatus for observation which is provided with drive control means for driving a variable angle prism on the basis of an output signal from vibration detecting means and in which the variable angle prism is installed between an objective lens and an erect prism.

10 Claims, 1 Drawing Sheet

US 6,917,470 B2

OPTICAL APPARATUS

This application is a division of application Ser. No. 08/906,107 filed Aug. 5, 1997 now U.S. Pat. No. 6,246,520, which is a continuation of application Ser. No. 08/567,065 filed Dec. 4, 1995, now abandoned, which is a continuation of Ser. No. 08/093,700 filed Jul. 20, 1993, now abandoned.

BACKGROUND OF THE INVENTION

1. Field of the Invention

This invention relates to an optical apparatus for observation such as a telescope having the image vibration correcting function of detecting the amount of vibration of the optical apparatus, and deflecting the optical axis of the optical apparatus so as to hold the optical image of the optical apparatus always at a predetermined position on the basis of the detection output.

2. Related Background Art

As an apparatus for eliminating the image vibration of an optical apparatus for observation, there are known binoculars with an image stabilizer as described in Japanese Laid-Open Patent Application No. 50-5058 wherein a gyroscope is connected to an erect prism supported by gimbals.

However, in the image stabilizer using a gyroscope, the rotor of the gyroscope is rotated at a high speed and therefore, much time is required before a motor is fully rotated, and since the prism is floating-supported by gimbals mechanism, sudden panning or tilting, when effected, causes the prism to strike against the inner wall of the optical apparatus, and this has caused a trouble in some cases. Also, after the use of the apparatus, it is necessary to effect the caging of the gyroscope and operation is cumbersome. Further, the gyroscope requires a certain degree of mass, and this has led to the disadvantage that the optical apparatus itself becomes heavy and bulky.

SUMMARY OF THE INVENTION

According to the present invention, a variable angle prism for changing the optical axis of an observation optical system is disposed between the objective lens of the observation optical system and an erect prism and the vertical angle of the variable angle prism is controlled in conformity with the vibration of an optical apparatus to thereby stabilize an optical image at a predetermined position and enable an object to be observed in a good condition free of image vibration.

DESCRIPTION OF THE PREFERRED EMBODIMENT

In an optical apparatus having an objective lens, a lens for observation and an erect prism, provision is made of vibration detecting means for detecting the amount of vibration of the optical apparatus, a variable angle prism which is means for changing the extended optical axis of said objective lens, and drive control means for driving said variable angle prism on the basis of an output signal from said vibration detecting means, and said variable angle prism is installed between said objective lens and said erect prism.

Figure 1:
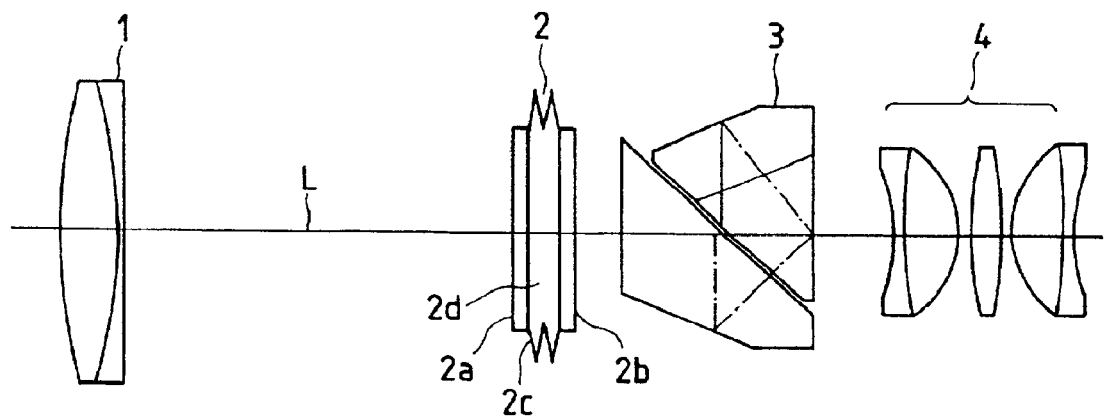
FIG. 1 is a cross-sectional view of a telephoto optical system according to an embodiment of the present invention.

FIG. 1 shows the optical cross-section of a telephoto optical system which is an embodiment of the present invention.

In FIG. 1, the reference numeral 1 designates an objective lens for forming the image of an object. As can be seen from FIG. 1, objective lens 1 is a composite lens of two lens elements in this embodiment. In some cases, the objective lens is divided into multiple groups. The letter L denotes the optical axis of the optical system. The reference numeral 2 designates a variable angle prism (hereinafter referred to as the VAP) which is means for changing the optical axis (or the optical path). The VAP 2 is of a construction in which liquid 2d having a uniform refractive index is enclosed in a bellows vessel 2c having its opposite ends adhesively secured to two transparent plates 2a and 2b.

The reference numeral 3 denotes an erect prism comprising two prisms spaced apart by a minute distance from each other. The forward prism has an inclined surface on the lower side thereof, and the rearward prism has a roof surface on the upper side thereof. This erect prism has the action of inverting an image vertically and rendering the image erect, and if it has a roof surface, the right and left will also be inverted. The prisms may be deformed.

The reference numeral 4 designates an eyepiece for observing therethrough the image formed by the objective lens 1. As can be seen from FIG. 1, eyepiece 4 has (a) a composite lens of two lens elements, (b) a lens element, and (c) another composite lens of two lens elements, in this embodiment. The objective lens 1, the variable angle prism 2, the erect prism 3, and the eyepiece 4 are disposed coaxially with the optical axis L. As can be seen from FIG. 1, the objective lens 1 and variable angle prism 2 form a front optical system with respect to the erect prism 3, and the eyepiece 4 forms a rear optical system with respect to the erect prism 3.

Figure 2:
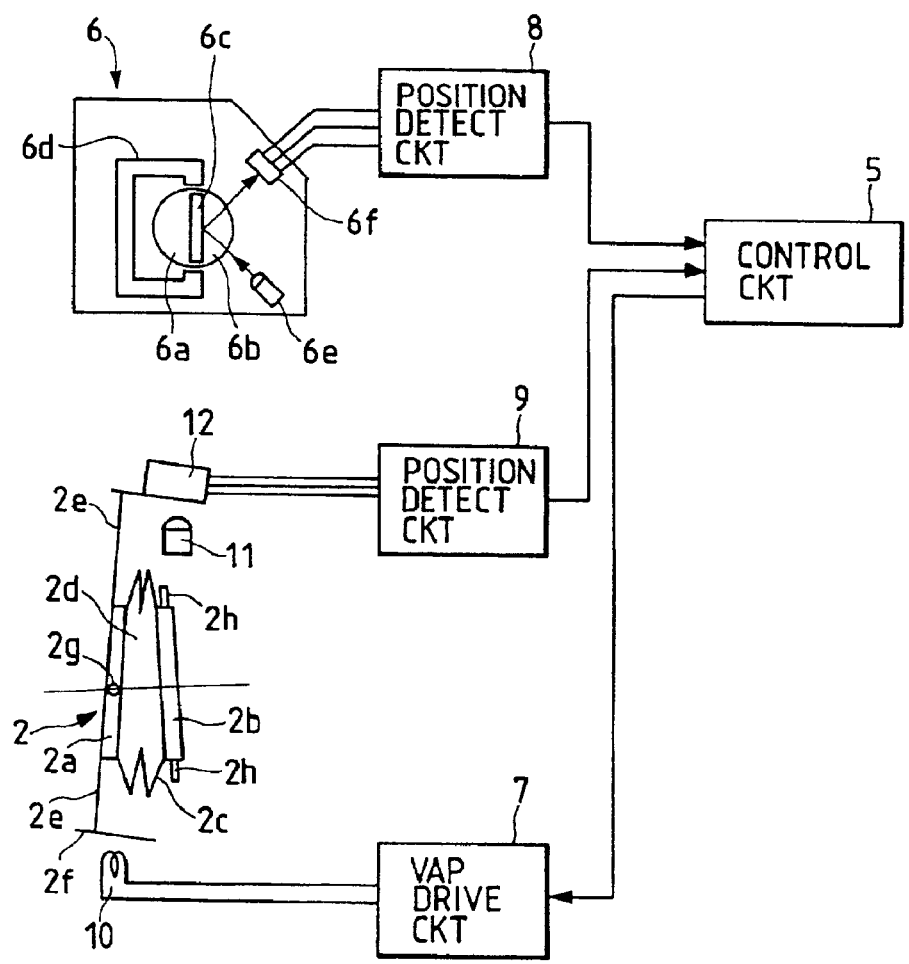
FIG. 2 is a block diagram showing the driving system of a construction unit.

FIG. 2 is a block diagram showing a driving method for the variable angle prism 2. In FIG. 2, the reference numeral 5 designates a control circuit comprising a microcomputer or the like which governs the vertical angle deflection drive control of the VAP 2, and the reference numeral 6 denotes a detecting sensor which is vibration detecting means for detecting the vibration of the telephoto optical system and which is mounted on a portion of a telescope body, not shown. Although detailed description of the vibration detecting sensor 6 is omitted because this sensor is not directly related with the present invention, a cylindrical case 6a is filled with liquid 6b having a predetermined refractive index, and a reflective float member 6c rotatable about a predetermined rotational axis is provided in the liquid 6b. This float member 6a is adapted to be held at a predetermined position when there is no vibration, by a close magnetic circuit consisted of a permanent magnet 6d provided so as to surround the case 6a. Design is also made such that when vibration occurs to the telescope body and the float member 6c rotates relative to the case 6a, the position of a spot light emitted from a light emitting element 6e, reflected by the surface of the float member 6c and entering a light receiving element 6f for position detection is varied. Thus, in conformity with the amount of vibration of the telescope body, the position of incidence of the light onto the light receiving element 6f is varied and the output signal thereof is varied. The output signal from the light receiving element 6f is output to the above-described control circuit 5 through a position detecting circuit 8 for detecting the position of the light spot. This output is representative of the angle of rotation of the telescope.

On the other hand, the VAP 2 is disposed between the objective lens 1 and the erect prism 3 and in proximity to the erect prism, and a magnetic circuit 10 is driven by a VAP drive circuit 7 controlled by the control circuit 5 in conformity with the output of a position detecting circuit 8 adjacent to the vibration detecting sensor 6, whereby a magnetic plate 2f secured to a support plate 2e coupled to the transparent plate 2a of the VAP 2 which is adjacent to the objective lens is moved and the transparent plate 2a is tilted. The magnetic plate 2f is supported on the telescope body, not shown, by a rotary shaft 2g protruded from the transparent plate 2a. Also, the amount of tilt of the transparent plate 2a is detected by a detector which comprises a light emitting element 11 and a light receiving element 12 and detects at what position on the light receiving surface of the light receiving element 12 the spotlight of the light emitting element 11 lies, and the output signal thereof is output to the control circuit 5 through a position detecting circuit 9. At that time, the control circuit 5 controls the VAP drive circuit 7 and drives the magnetic circuit 10 so that the difference between the output of the position detecting circuit 8 adjacent to the vibration detecting sensor 6 and the output of the position detecting circuit 9 adjacent to the VAP 2 may be "0", and tilts the transparent plate 2a of the VAP 2. Although not shown, the transparent plate 2b of the VAP 2 can be tilted in a direction orthogonal to the direction of tilt of the transparent plate 2a, by a method similar to the method described above with respect to the transparent plate 2a. The numeral 2h designates a rotary shaft provided in the transparent plate 2b. In this manner, the vertical angle of the variable angle prism 2 is two-dimensionally varied, whereby the optical axis can be deflected in a direction to suppress the vibration of image created by the vibration of the telephoto optical system and as a result, the user of the telephoto observation apparatus can obtain a stable image free of vibration. If design is made such that a TV camera can be mounted rearwardly of the eyepiece 4, an object will conveniently become observable by a TV monitor.

As described above, the variable angle prism is disposed in the ray converging portion rearward of the objective lens, whereby there can be realized an optical apparatus in which the variable angle prism may be compact and which is excellent in the frequency characteristic which is one of image stabilizing performances. Also, by the variable angle prism being disposed forwardly of the erect prism, there is provided an advantage that the expensive erect prism need not to become bulky. Thus, by using the variable angle prism, there is obtained the effect that there can be relatively inexpensively manufacture an observation apparatus with an image stabilizer which is compact and light in weight as compared with the aforedescribed example of the prior art.

What is claimed is:

1. An observation optical apparatus for observing an image of an object, said apparatus comprising:
    an erecting prism;
    a front optical system arranged on the light incidence side of said erecting prism;
    a rear optical system arranged on the light emission side of said erecting prism;
    a sensor for detecting a shake of said apparatus; and
    a correction system for correcting a shake of the image due to the shake of said apparatus, by using (a) an output from said sensor and (b) a shake correction optical system in said front optical system,
    wherein said front optical system includes a plurality of lens elements, and said rear optical system includes a plurality of lens elements,
    wherein the number of the lens elements of said rear optical system is greater than that of the lens elements of said front optical system, and
    wherein said shake correction optical system is arranged between (a) said erecting prism and (b) the closest one to the side of said object among said plurality of lens elements of said front optical system.

2. An observation optical apparatus according to claim 1, wherein said shake correction optical system is provided with a movable transparent optical member.

3. An observation optical apparatus according to claim 2, wherein said movable transparent optical member is a variable angle prism.

4. An observation optical apparatus according to claim 1, wherein each of said front optical system and said rear optical system comprises a composite lens.

5. An observation optical apparatus for observing an image of an object, said apparatus comprising:
    an erecting prism;
    a front optical system arranged on the light incidence side of said erecting prism;
    a rear optical system arranged on the light emission side of said erecting prism;
    a sensor, arranged in a body of said apparatus, for detecting a shake of said apparatus;
    a control circuit electronically connected to said sensor, for receiving an output from said sensor;
    an actuator electrically connected to said control circuit, the driving of said actuator being controlled in accordance with an output from said control circuit, responsive to an output from said sensor; and
    a shake correction optical element in said front optical system, said shake correction optical element being connected to said actuator,
    wherein said front optical system includes a plurality of lens elements, and said rear optical system includes a plurality of lens elements,
    wherein the number of the lens elements of said rear optical system is greater than that of the lens elements of said front optical system, and
    wherein said shake correction optical element is arranged between (a) said erecting prism and (b) the closest one to the side of the object among said plurality of lens elements of said front optical system.

6. An observation optical apparatus according to claim 5, wherein said shake correction optical element is a variable angle prism.

7. An observation optical apparatus according to claim 5, wherein each of said front optical system and said rear optical system comprises a composite lens.

8. An observation optical apparatus for observing an image of an object, said apparatus comprising:
    a front optical system having a plurality of optical elements, said front optical system being arranged on the light incidence side of an erecting prism;
    a rear optical system having a plurality of optical elements, said rear optical system being arranged on the light emission side of the erecting prism; and
    a sensor for detecting a shake of said apparatus,
    wherein the closest one to the erecting prism, among said plurality of optical elements of said front optical system, suppresses a shake of an image of the object, the image being created by said front optical system, the erecting prism, and said rear optical system, the suppression being in accordance with an output from said sensor, and
    wherein the number of the optical elements of said rear optical system is greater than that of the optical elements of said front optical system.

9. An observation optical apparatus according to claim 8, wherein the closest one to the erecting prism, among said plurality of optical elements of said front optical system, has two rotational axes.

10. An observation optical apparatus according to claim 8, wherein the closest one to the erecting prism, among said plurality of optical elements of said front optical system, is a variable angle prism.

* * * * *